United States Patent
Hindle et al.

(10) Patent No.: US 10,877,923 B2
(45) Date of Patent: Dec. 29, 2020

(54) CIRCUIT ARCHITECTURE MAPPING SIGNALS TO FUNCTIONS FOR STATE MACHINE EXECUTION

(71) Applicant: Imagination Technologies Limited, Kings Langley (GB)

(72) Inventors: Bert Hindle, Bristol (GB); Ben Fletcher, Bristol (GB)

(73) Assignee: Imagination Technologies Limited, Kings Langley (GB)

( * ) Notice: Subject to any disclaimer, the term of this patent is extended or adjusted under 35 U.S.C. 154(b) by 429 days.

(21) Appl. No.: 15/496,217

(22) Filed: Apr. 25, 2017

(65) Prior Publication Data

US 2017/0308502 A1     Oct. 26, 2017

(30) Foreign Application Priority Data

Apr. 25, 2016   (GB) .................................. 1607172.2

(51) Int. Cl.
| | |
|---|---|
| *G06F 9/44* | (2018.01) |
| *G06F 13/12* | (2006.01) |
| *G06F 15/17* | (2006.01) |
| *G06F 15/177* | (2006.01) |
| *G06F 15/78* | (2006.01) |
| *G05B 19/045* | (2006.01) |
| *G05B 19/04* | (2006.01) |
| *G06F 9/4401* | (2018.01) |
| *G06F 1/32* | (2019.01) |

(52) U.S. Cl.
CPC ........ *G06F 15/177* (2013.01); *G05B 19/04* (2013.01); *G05B 19/045* (2013.01); *G06F 9/44* (2013.01); *G06F 9/4411* (2013.01); *G06F 13/12* (2013.01); *G06F 13/124* (2013.01); *G06F 15/17* (2013.01); *G06F 15/78* (2013.01); *G06F 15/7821* (2013.01); *G06F 1/32* (2013.01); *Y02D 10/00* (2018.01)

(58) Field of Classification Search
None
See application file for complete search history.

(56) References Cited

U.S. PATENT DOCUMENTS

| | | | |
|---|---|---|---|
| 5,878,217 A * | 3/1999 | Cherukuri | ............. G06F 13/387 709/212 |
| 5,920,726 A | 7/1999 | Anderson | |
| 2007/0288778 A1 | 12/2007 | Zhuang et al. | |

(Continued)

FOREIGN PATENT DOCUMENTS

WO      2013/052894 A1     4/2013

*Primary Examiner* — Tanh Q Nguyen
(74) *Attorney, Agent, or Firm* — Potomac Law Group, PLLC; Vincent M DeLuca

(57) ABSTRACT

An integrated circuit includes a memory configured to store a plurality of functions; a mapping interface configured to perform a mapping from a received first signal to a first function of the plurality of functions; and a state machine configured to, in response to said mapping, execute the first function; wherein the integrated circuit is arranged to, in dependence on the execution of the first function at the state machine, modify said mapping between the first signal and the first function so as to re-map the first signal to a second function of the plurality of functions such that, on receiving a subsequent first signal, the state machine is configured to execute the second function.

20 Claims, 5 Drawing Sheets

(56) References Cited

U.S. PATENT DOCUMENTS

| | | | |
|---|---|---|---|
| 2010/0250974 A1* | 9/2010 | Ristic | G06F 1/3203 |
| | | | 713/300 |
| 2011/0153546 A1* | 6/2011 | Latta | G06N 5/00 |
| | | | 706/54 |
| 2017/0308488 A1* | 10/2017 | Hindle | G06F 13/24 |
| 2017/0308502 A1* | 10/2017 | Hindle | G06F 9/4411 |

* cited by examiner

CIRCUIT ARCHITECTURE MAPPING SIGNALS TO FUNCTIONS FOR STATE MACHINE EXECUTION

BACKGROUND

This application relates to circuit architectures. In particular the application relates to integrated circuits and communications interfaces.

System designs, such as those for systems-on-chip (SoC), typically require capabilities of managing multiple tasks and/or managing multiple power islands or power domains. This can lead to complexity in managing all of these tasks/power islands. Such complexity can arise from complexities in programming operations for multiple power islands and from complexities in managing power islands in different contexts, such as those of SoC with varying levels of complexity themselves: from Internet-of-Things platforms through to heavy compute platforms.

Typically a central processing unit (CPU) might be used to manage tasks/power islands in these situations. However, the CPU may be overloaded with other processing tasks, and this could lead to system delays.

Complexities in systems such as SoC lead to individualised approaches that can tailor the process management to the particular requirements of the relevant system. Such approaches may lead to improvements as regards the operation of that particular system. However, these approaches can have the drawback that they are then no longer applicable to other systems.

There is a need for an improved integrated circuit. There is also a need for an improved communications interface.

Such improved integrated circuits and improved communications interfaces are not restricted to managing power islands, but have a more general, or generic, application. For example the improved integrated circuits and improved communications interfaces can find application in systems and/or processes in which functions are run in response to signals, for example signals generated on the occurrence of an event.

BRIEF SUMMARY

There is provided an integrated circuit comprising:
a memory configured to store a plurality of functions;
a mapping interface configured to perform a mapping from a received first signal to a first function of the plurality of functions; and
a state machine configured to, in response to said mapping, execute the first function;
wherein the integrated circuit is arranged to, in dependence on the execution of the first function at the state machine, modify said mapping between the first signal and the first function so as to re-map the first signal to a second function of the plurality of functions such that, on receiving a subsequent first signal, the state machine is configured to execute the second function.

The integrated circuit may be arranged to re-map the first signal to the second function in dependence on the number of times the first function is executed at the state machine. The integrated circuit may be arranged to re-map the first signal to the second function as part of the execution of the first function at the state machine. The mapping may comprise a first pointer associated with the first signal, which first pointer points to the first function.

The integrated circuit may be arranged to re-map the first signal to the second function by associating a second pointer with the first signal in place of the first pointer, which second pointer points to the second function. The integrated circuit may be arranged to re-map the first signal to the second function by modifying the first pointer to point to the second function.

The integrated circuit may comprise an event queue configured to receive a plurality of event indices, the state machine being configured to read event indices on the event queue, wherein the reading by the state machine of an event index from the event queue causes the state machine to execute at least one of the plurality of functions.

The mapping may comprise writing a first event index to the event queue, which first event index when read by the state machine causes the state machine to execute the first function. The first event index may comprise the first pointer.

The re-mapping of the first signal to a second function may comprise writing a second event index to the event queue, which second event index when read by the state machine causes the state machine to execute the second function. The second event index may comprise one of the modified first pointer and the second pointer.

The state machine may be configured to have an idle state in which it waits for an event index to be written to the event queue, and an active state in which it executes at least one of the plurality of functions in response to reading an event index from the event queue.

Where the first function is a large function, the integrated circuit may be arranged to break the first function into smaller functions comprising a first smaller function and a second smaller function, and to associate a third pointer with the first smaller function and a fourth pointer with the second smaller function such that the third and fourth pointers point to the respective smaller functions;

the integrated circuit may be arranged, on receiving the first signal, to write an event index comprising the third pointer to the event queue such that the state machine executes the first smaller function; and subsequently to write an event index comprising the fourth pointer to the event queue such that the state machine executes the second smaller function after the execution of the first smaller function.

Where the first function is a large function, it may be broken down into smaller functions for rescheduling in dependence on at least one of:
whether the number of event indices on the event queue is above a given threshold, and
whether the large function is time-critical.

The integrated circuit may be arranged to write the event index comprising the fourth pointer to the event queue during or at the end of execution of the first smaller function. The event queue may be arranged to hold a maximum of N event indices, and the integrated circuit is arranged to determine the number of event indices held on the event queue.

The integrated circuit may be arranged so that on completion of an initialisation sequence, a flag is set to cause and/or enable the state machine to start processing event indices held on the event queue. The mapping interface may comprise at least one of a hardware interface and a software interface.

The mapping interface may comprise a communications interface for interfacing between a host system and the state machine, the communications interface comprising:
an event slot, the event slot comprising a plurality of registers including:
a write register for writing by the host system, and a read register for reading by the host system, wherein the event slot may be addressed from the host system by a single address location permitting the host system to write data to the write register and/or read data from the read register; and wherein the write register and the read register may be individually addressable by the state machine.

The event slot may be arranged to communicate with the state machine by placing at least one event index on the event queue. The event slot may comprise: a mask register for setting mask values, and a reference register for storing reference information. The reference register may comprise a plurality of fields comprising: at least one activate field for controlling the activation of events, at least one function pointer index field for holding at least one function pointer index, an interrupt number field for holding an interrupt line number, and an interrupt enable field for holding an interrupt enable bit.

The at least one activate field may comprise:
an activate on write field for indicating that a write function pointer index should be passed to the event queue,
an activate on read field for indicating that a read function pointer index should be passed to the event queue, and
an activate on interrupt acknowledge field for indicating that an interrupt function pointer index should be passed to the event queue.

The event slot may be at least one of:
arranged so that the write function pointer index is passed to the event queue on determining that the host sets any bit in the write register whose corresponding bit in the mask register is not set,
arranged so that the read function pointer index is passed to the event queue on determining that the read register is read by the host, and
arranged so that the interrupt function pointer index is passed to the event queue on determining that the host sets any bit in the write register whose corresponding bit in the mask register is set.

The communications interface may comprise a plurality of event slots, and at least two of the plurality of event slots are addressed from the host system using different address locations. The communications interface may be located in the memory.

There is provided a power management unit comprising the integrated circuit as defined above.

There is provided a method of executing at least one function in response to a signal received by an integrated circuit, the integrated circuit comprising a memory, a mapping interface and a state machine, the method comprising:
storing a plurality of functions in the memory;
receiving a first signal at the integrated circuit;
performing a mapping at the mapping interface from the received first signal to a first function of the plurality of functions;
executing at the state machine the first function in response to said mapping;
modifying at the integrated circuit said mapping between the first signal and the first function so as to re-map the first signal to a second function of the plurality of functions such that, on receiving a subsequent first signal, the state machine is configured to execute the second function.

The method may comprise: receiving a subsequent first signal at the integrated circuit; and executing the second function at the state machine in response to the re-mapping of the first signal. The method may comprise: re-mapping the first signal to the second function in dependence on the number of times the first function is executed at the state machine.

The method may comprise: re-mapping the first signal to the second function as part of the execution of the first function at the state machine. The method may comprise: mapping the first signal to the first function by associating a first pointer with the first signal, which first pointer points to the first function.

The method may comprise: re-mapping the first signal to the second function by associating a second pointer with the first signal in place of the first pointer, which second pointer points to the second function. The method may comprise: re-mapping the first signal to the second function by modifying the first pointer to point to the second function.

The integrated circuit may comprise an event queue, and the method may comprise: mapping the first signal to the first function by placing a first event index comprising the first pointer on the event queue; and re-mapping the first signal to the second function by placing a second event index comprising one of the modified first pointer and the second pointer on the event queue.

The method may comprise:
where the first function is a large function, breaking the first function into smaller functions comprising a first smaller function and a second smaller function;
associating a third pointer with the first smaller function and a fourth pointer with the second smaller function such that the third and fourth pointers point to the respective smaller functions;
on receiving the first signal, placing an event index comprising the third pointer on the event queue, and executing at the state machine the first smaller function; and
placing an event index comprising the fourth pointer on the event queue, and executing at the state machine the second smaller function after the execution of the first smaller function.

The method may comprise: where the first function is a large function, determining at least one of whether the number of event indices on the event queue is above a given threshold, and whether the large function is time-critical, and breaking down the large function into smaller functions for rescheduling in dependence on the determination.

The integrated circuit may be embodied in hardware.

There is provided an integrated circuit configured to perform the method as defined above.

There is provided a method of manufacturing, at an integrated circuit manufacturing system, an integrated circuit as defined above.

There is provided an integrated circuit definition dataset that, when processed in an integrated circuit manufacturing system, configures the system to manufacture an integrated circuit as defined above.

There is provided a non-transitory computer readable storage medium having stored thereon a computer readable description of an integrated circuit that, when processed in an integrated circuit manufacturing system, causes the integrated circuit manufacturing system to manufacture an integrated circuit as defined above.

There is provided an integrated circuit manufacturing system comprising:
a non-transitory computer readable storage medium having stored thereon a computer readable integrated circuit description that describes the integrated circuit as defined above;

a layout processing system configured to process the integrated circuit description so as to generate a circuit layout description of an integrated circuit embodying the integrated circuit as defined above; and an integrated circuit generation system configured to manufacture the integrated circuit according to the circuit layout description.

There is provided computer program code for performing a method as defined above.

There is provided a non-transitory computer readable storage medium having stored thereon computer readable instructions that, when executed at a computer system, cause the computer system to perform the method as defined above.

BRIEF DESCRIPTION OF THE DRAWINGS

Examples will now be described in detail with reference to the accompanying drawings. In the drawings.

DETAILED DESCRIPTION

Figure 1:
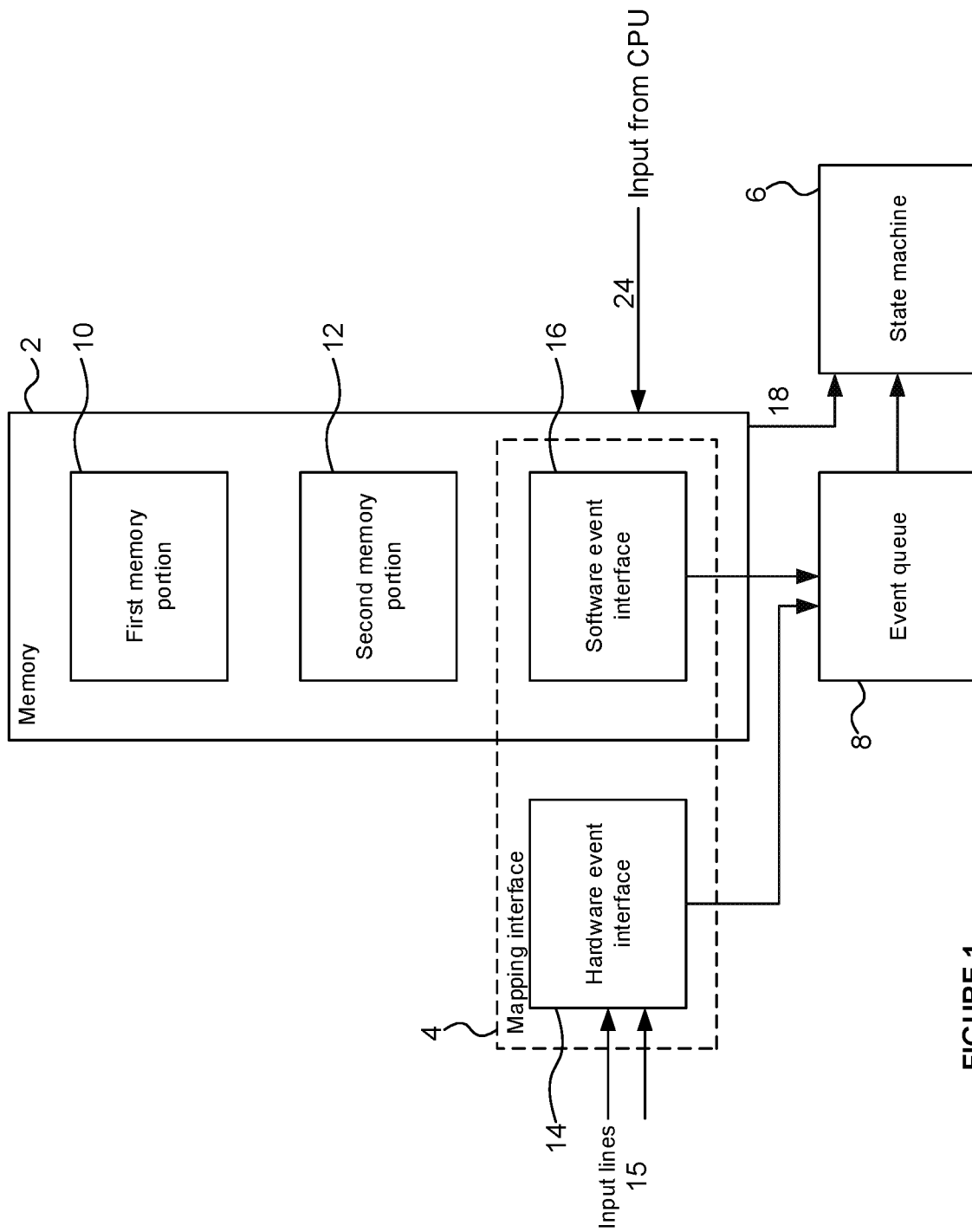
FIG. 1 shows a schematic representation of a portion of a power management unit.

The following description is presented by way of example to enable a person skilled in the art to make and use the invention. The present invention is not limited to the embodiments described herein and various modifications to the disclosed embodiments will be apparent to those skilled in the art.

The present inventors consider that almost all system-on-chip (SoC) designs (across a wide range of design complexity) will require multiple power islands or power domains, and correspondingly more advanced power management techniques to meet their target power consumption constraints. These constraints are likely to be affected by thermal issues, battery life, legislation and power consumption restrictions (such as in rack mounted servers) amongst others.

The present examples address these issues by providing a generic approach to an integrated circuit, such as one that could be used in power management architectures, that can enable easy and consistent integration into any SoC (or indeed any other suitable system) and which can provide reliable and sensible interactions with software operating systems.

Whilst a CPU can be used to manage power islands, in some situations the CPU itself might be powered down, so would be unable to manage tasks. There is therefore a need for a 'lightweight' controller which can be provided in an always-on power domain for dealing appropriately with incoming tasks.

It is advantageous to provide the 'lightweight' design or system to as to minimise power consumption during standby conditions and to be area-optimised so as to take up less semiconductor real estate. Performance in moving between states such as power states is not critical for many applications, so in these cases power management operations can be run at a relatively slower frequency without affecting overall performance.

The design or system is advantageously programmable and/or flexible. This can mean that it is configurable to suit the needs of a variety of different platforms, from simple SoCs (such as in Internet-of-Things (IoT) applications) with single switchable power domains and bus-based interconnections, through to complex multimedia and compute platforms with many power domains, voltage islands and complex Network-on-Chip (NoC) connectivity. For simple SoCs, it should be possible to hard-code the required functionality to reduce both hardware and software complexity.

Further, the design or system is advantageously able to respond both to hardware events, such as power events, and software events, such as software event requests. It should be able to move the SoC between different power states by controlling at least some of power domain voltage switches, isolation and/or retention cells, the reset state of power domains, and clocks, phase-locked loops (PLLs) and analogue IPs amongst others. It should also be able to control power domains external to the SoC, for example by effecting control of voltage switches and/or voltage regulators.

The present examples will be discussed in the context of an integrated circuit (IC) which might be or might be part of a power management system, such as a power management unit (PMU), but it will be understood that the principles set out are applicable more broadly than this. For ease of reference the integrated circuit in the context of the power management application will be referred to below as a PMU IC, though the invention is not limited to power management applications.

A PMU IC may be located in a power domain that is always switched on (an always-on (or AON) domain). It is therefore always able to run, or be in standby or idle, as required. From the always-on domain the PMU IC can control other power domains by running various functions (so as to turn the other domains on and off: this can involve sending power-down requests, receiving acknowledgements, isolating signals and powering the other domains up and/or down).

A PMU IC will have two main tasks: to power up a SoC from a cold reset, and to respond to events (for example power events, in the context of a PMU) which may come from software via the host processor/operating system, such as the central processing unit (CPU), and also from hardware signalling, by moving the SoC between its various power states, and also by assisting in any other functions required, for example as part of that power event.

The processing of each power event can follow a unique data flow that is index-matched to the physical line of a hardware power event request, or the address used by a software event request. The actions undertaken in response to such event requests are a mixture of dedicated power and reset controls, bus accesses (either to peripherals in an always-on domain, or to the wider system) and via general purpose hardware input/output lines.

The PMU IC can achieve this by utilising a single-thread, sequential interpreter, such as a state machine, decoding instructions which are typically stored locally to the PMU IC (but which could also be stored remote from the PMU IC and executed from the remote memory). The state machine can be task-oriented. The state machine can be small and/or can have compact code.

The integrated circuit can, through a modification of the mapping between at least one signal and at least one function, provide increased functionality whilst minimising or reducing the complexity of the integrated circuit. This arrangement can reduce power consumption by reducing the processing steps needed, at least for processing one function subsequently to the first processing of that function. This can reduce the time taken to subsequently process that function, which can provide speed enhancements for the integrated circuit.

The structure of the PMU IC will now be briefly described with reference to FIG. 1. In the illustrated example, a PMU comprises an integrated circuit which interfaces between a host (CPU) and control interfaces, and also between hardware signalling inputs and the control interfaces.

In one example the integrated circuit comprises a memory 2, a mapping interface 4 and a state machine 6. In the example illustrated in FIG. 1 the integrated circuit also comprises an event queue 8, though it need not.

The memory 2 comprises a first memory portion 10 and a second memory portion 12 for storing operational control functions and parameters which comprise instructions for the state machine 6. The first memory portion 10 and the second memory portion 12 are in some examples contiguous portions of the memory 2. The mapping interface 4 comprises, in this example, both a hardware event interface 14 and a software event interface 16. In one example, the hardware event interface 14 is arranged to deal with low-level hardware requests and acknowledgements. In the illustrated example the hardware event interface 14 is connected to two hardware input lines 15 (though any suitable number can be provided) for receiving signals from hardware on at least one of these input lines.

In one example the software event interface 16 is implemented in a third memory portion of the memory 2 which connects to an input from the host CPU (illustrated schematically at 24). The third memory portion is in some examples contiguous with the second memory portion 12 in the memory 2.

The integrated circuit is arranged in one example so that the state machine 6 takes data from the mapping interface 4 (i.e. one or both of the hardware event interface 14 and the software event interface 16) and processes that data in accordance with the instructions stored in the first and/or second memory portions, as will be described in more detail below.

In the example shown in FIG. 1, the hardware event interface 14 and the software event interface 16 are arranged to pass data to the state machine 6 via the event queue 8. In other words, the mapping interface 4 passes or outputs data to the event queue 8, from where it can be read by the state machine 6. Details of how the data passed to the event queue 8 affects the operation of the state machine 6 will be described in more detail below.

In one example, the first memory portion 10 comprises a power-on-sequence read-only memory (POSROM). This is a non-volatile structure and will be the fixed entry-point for the state machine 6 on coming out of reset. In one example, the instructions stored in the POSROM will turn on the supply switches and deassert the resets for just the minimum required number of power domains needed to allow the host CPU to begin booting across all of its boot sequence.

In one example, the second memory portion 12 comprises a read-only memory (ROM) or a random access memory (RAM). In some examples the second memory portion 12 contains the instructions for executing power management events. These instructions comprise functions in the memory 2. The choice of whether to use a ROM or a RAM depends in some examples on the SoC design constraints.

A ROM offers simple power-management architectures where the number and complexity of power events is such that they can be specified during system design. This therefore offers a compact and low power implementation. For example, this arrangement can avoid the need for built-in self-test (BIST) collars. Such a ROM could be considered as an extension of the POSROM.

A RAM offers a more flexible power management architecture with potentially more features. When using a RAM, the state machine instructions are downloaded to the RAM after host boot-time as a 'firmware' block. In some examples this can be achieved by a direct memory access (DMA) transfer from non-volatile flash storage. As will be understood, this is an example of transferring such a 'firmware' block, and other mechanisms could also be used. It is also possible to boot directly from volatile memory, for example in a re-boot scenario where power is maintained to the volatile memory during the re-boot process. For example, software can be kept in (or loaded into) DDR memory located in the always-on domain. This can enable a fast boot, taking advantage of the speed of DDR compared to, for example, flash memory.

The use of a RAM gives the flexibility to update the execution and mapping of power events as part of the host CPU's secondary bootloader sequence, without having to patch any drivers in the operating system kernel.

A combination of a ROM and a RAM is also possible.

In some examples, the integrated circuit is configured for boot-up or initialisation from at least one of a local ROM, a local RAM and a remote memory. This can allow firmware initialisation whilst permitting updating of the firmware as required.

The state machine 6 is, in some examples, the 'core' of the PMU IC. That is to say, the state machine 6 is arranged to process instructions within the PMU IC. The state machine 6 will initially execute the instructions in the POSROM before moving to a 'wait' (or idle) state. The idle state consumes less power than an active state in which the state machine processes instructions. The state machine 6 need not always poll the event queue but can be in a quiescent state. This arrangement can save power compared to systems which are always in a polling loop or waiting for an interrupt.

Where a RAM is used, the state machine 6 is arranged not to process anything that might be on the event queue 8 until the firmware has completed loading in the RAM and the integrated circuit is ready to begin accepting new events for passing to the event queue 8, for example by placing event indices on the event queue. To achieve this, the last bit of a firmware block, or the last bit of the RAM memory can be used as, or to set, a 'firmware ready' flag. Once set, this flag can indicate to the state machine 6 that the integrated circuit is ready to process events, and that event indices on the event queue 8 should then be processed by the state machine 6. In some examples, this flag is passed to the state machine 6 via line 18.

Thereafter the state machine 6 will parse event requests coming off the event queue 8, for example as event indices. In some examples the indices are associated with function pointers which point to respective functions in the memory. For example, the indices can comprise the respective function pointers. These indices cause the state machine 6 to execute the instructions of the respective functions in sequence until there is either a jump to another function or a return to the 'wait' state ready to process the next event index on the queue 8.

In some examples a function pointer refers (or points) to a function in the memory (for example by comprising a memory location of that function). That is to say, the event queue 8 is arranged to hold event indices, which may be the function pointers, to trigger function execution, such as for power management events. Thus the particular event index chosen will cause the state machine 6 to execute a given function. In some examples each index is 7 bits wide, supporting a maximum of 128 function pointers.

The event queue 8 is in some examples a first in first out (FIFO) queue. The depth of the queue, i.e. the number of entries, N, that can be held on the queue at any one time can be specified as desired, according to the application. The PMU IC is arranged to determine the number of event indices, n, on the event queue 8, and to notify the processor, for example by generating an interrupt when the event queue 8 is full, i.e. when n=N, or an overflow condition has been reached.

In at least some examples, overflow conditions are avoided by monitoring the number of events and the state of the event queue 8, for example the number of events currently pending (i.e. being held on the queue 8). The PMU IC may be configured so as not to pass new events to the queue 8 when it determines that the event queue 8 is full. Overflow conditions can be minimised by considering the typical number of events that are likely to be generated at any one time, and ensuring that N is sufficiently large to be able to accommodate all such events.

Interactions between the host CPU and the state machine 6 are dealt with through the mapping interface 4. In particular the interactions are, in one example, dealt with through a communications interface 20 (shown schematically in FIG. 2). In some examples the software event interface comprises the communications interface. In some examples the mapping interface 4 comprises the communications interface 20. In some examples the communications interface 20 is located in the third memory portion.

The communications interface 20 is in at least some examples implemented as a region of flop-based registers and associated logic to manage at least one of bi-directional data transfer, event triggering and interrupt support. The number of flops can be minimised within performance constraints to increase battery life. In some examples, the registers are 32-bit registers. The registers are grouped into at least one event slot 22. In some examples, and as shown schematically in FIG. 2, an event slot 22 comprises a group of 4 registers. The at least one event slot 22 permits communication between the host CPU and the PMU IC for the triggering of unique power management events. In some examples, the at least one event slot 22 is the single point of communication between the host CPU and the PMU IC. In some examples the software event interface and/or the communications interface is arranged to receive a signal indicative of an event by the writing of information to the event slot. The event slot 22 will be described in more detail below.

This structure, i.e. that provided by the integrated circuit as outlined above, means that the activity required to move between power states is reduced to high level commands from the perspective of the operating system's power management driver. Any SoC-specific control requirements (such as clock programming, off-chip power control, basic hardware setup and process/voltage/temperature (PVT) measurement and/or control) are then agnostic to the design of the PMU IC, whilst power domain control (such as reset, isolation and power switching) is under the direct control of the PMU IC.

Figure 3:
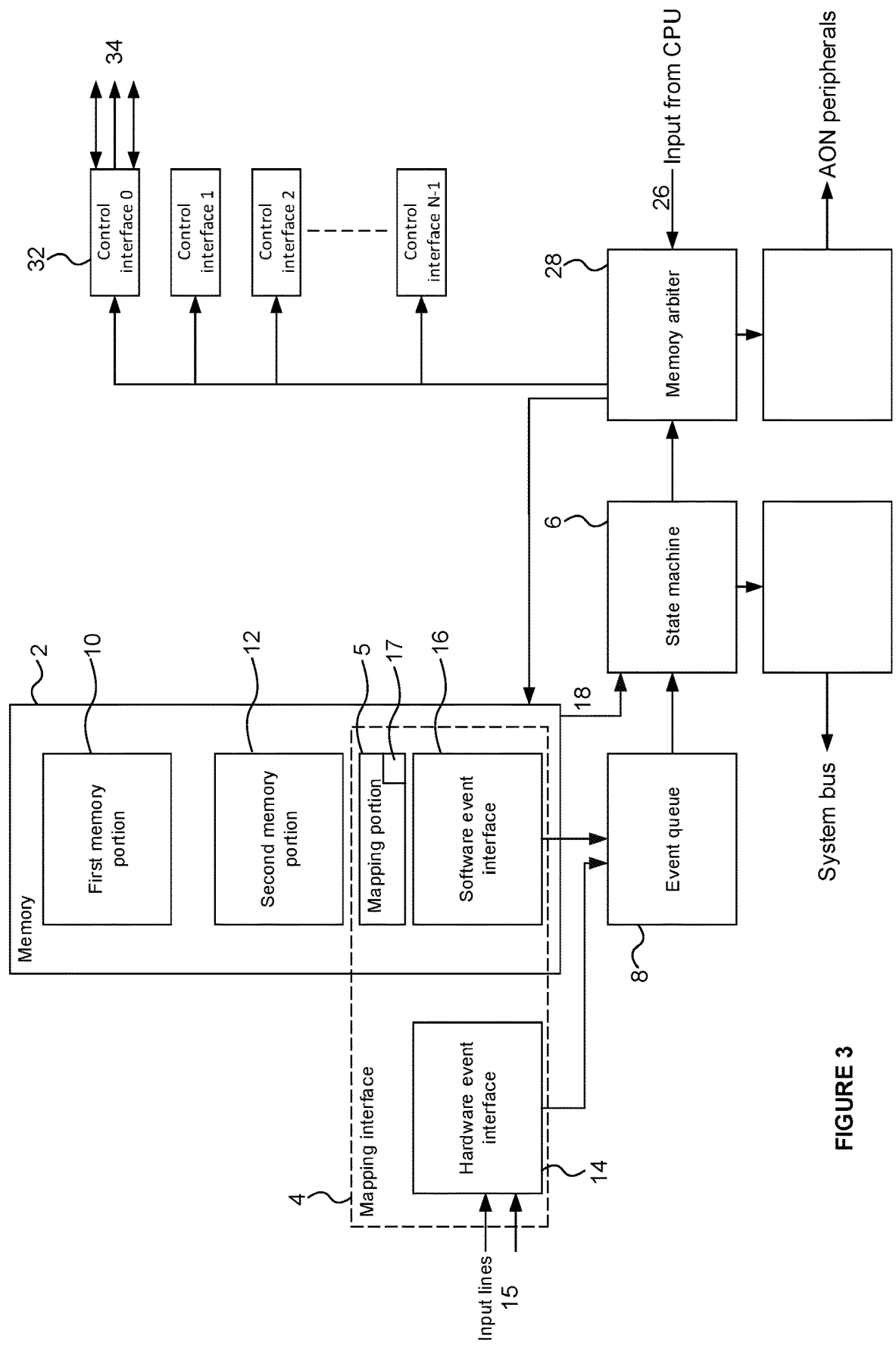
FIG. 3 shows another schematic representation of a portion of a power management unit.

Referring again to FIG. 1, the integrated circuit is, in some examples, arranged to receive communications from a host CPU (illustrated schematically at line 24). With reference also to FIG. 3, in one example, the communication from the host CPU (at line 26) passes to the memory 2 via a memory arbiter 28. The communication from the host CPU allows the host CPU to download firmware (where applicable) and to communicate with the RPU about software event requests (and hardware event requests in emulation mode). This also passes through requests to peripherals in the always-on power domain to a first bus master, such as a peripherals bus master in the always-on domain.

The memory arbiter 28 is connected to the state machine 6. The memory arbiter 28 provides a basic arbitration of internal and external memory requests to serve both the memory 2 and control interfaces 32. The control interfaces 32 comprise system hardware controlling inputs and/or outputs, which can effect network, power and/or systems control. The control interfaces 32 are in some examples at least some of version registers, general interrupt registers and direct control registers.

The control interfaces 32 are in some examples accessible to both the host CPU and the state machine 6 and cover hardware version, configuration parameters, debug (host-driven) control and general interrupt management.

In some examples, there are a set of general interrupt registers for error conditions that may be generated by the PMU IC. These include errors mentioned above which can be set when the event queue is full.

The mapping interface 4 allows the mapping and re-mapping of addresses, when the firmware is ready, between accesses on page boundaries (where the page size is a build-time parameter) and the event slot(s) 22. The memory 2 also permits monitoring of the communications interface 20 in order to push event indices onto the event queue 8 and also to manage and generate event-based interrupts. The memory 2 also permits access controls to the rest of the PMU.

Referring again to FIG. 3, in some examples the PMU comprises multiple control interfaces 32, one per switchable power domain. These provide a low-level interface to power switches, isolation control, reset control and local power supervision. For example, each control interface 32 is connected to a respective power domain. On receiving a command (for example as part of the processing of a function by the state machine) to power down that power domain, the control interface will in some examples send a power down request signal to the relevant domain. The domain will acknowledge the power down request if it is in a condition to be powered down. If the power domain is busy and powering down will interrupt its operation it might either refuse the power down request or simply not acknowledge it. If the power domain acknowledges the power down request, the control interface 32 will isolate the domain to ensure that spurious signals are not output from the domain. After the domain has been isolated (and its output(s) entered into known states) the domain will be powered down.

As shown schematically at 34 in FIG. 3, the control interfaces 32 communicate with their respective power domains. The schematic communication lines shown at 34 have not been shown on each control interface 32 represented for clarity, but it is to be understood that each control interface 32 is similarly connected to its respective domain. Control interface 0 to control interface N−1 are shown in FIG. 3, illustrating the instances of control interfaces 32 for N different power domains.

In some examples, the integrated circuit is arranged to access input/output (IO) control registers (not shown, but which directly connect to the state machine 6 in at least some examples). The IO control registers communicate with general purpose input and output (GPIO) lines. The IO control registers are used for manipulating extra hardware interfaces. In some examples the IO control registers are 32 bits wide. The IO control registers are in some examples referenced by index using specific GPIO instructions.

The state machine 6 is, in some examples, a single-stage, single-thread instruction decoder. In the context of the present description of the PMU IC, the state machine 6 is dedicated to power management functions. The state machine 6 is in some examples based on a 16-bit wide byte address/program counter, allowing PMU IC configurations with up to 64 KB of RAM.

The state machine 6 comprises a number of local registers. In some examples one of these local registers is arranged to hold a 16-bit program counter. The state machine 6 is arranged to update the program counter with a function pointer address whenever an event is available at the top of the event queue 8. Each instruction in the memory 2 pointed to by that address is interpreted and executed in turn, with the program counter being incremented by the length of the instruction, unless a jump or return is executed. Instructions are variable-length for code compactness. The instructions are in some examples made up of at least one of a 6-bit opcode (supporting up to 64 instructions), two condition flags and optional operand data.

A jump instruction may be a jump to another function in the memory 2. This can allow one set of instructions to refer to another set of instructions. Permitting this type of behaviour can allow more complex functionality to be built up whilst maintaining code compactness.

A return instruction may be a return to a previous portion of memory 2 at which instructions were being executed. In other words, a first set of instructions can be executed, which cause a jump to a second set of instructions. At the end of the second set of instructions, a return command can cause the state machine 6 to return to the end of the first set of instructions, and to continue processing from that point.

A stop instruction may cause the state machine 6 to revert to its idle state, in which it either processes the next event index at the top of the event queue 8 or waits in the idle state for another event index to be placed on the queue 8.

The mapping interface 4 is configured to perform a mapping from an input signal to a function. In other words, the mapping interface can provide an output associated with a given function in response to receiving a particular input, for example a hardware or a software event. In some examples, the mapping interface comprises a mapping portion 5, which is a portion of the memory 2 that describes the mapping between input signals and functions such as the functions stored in the memory 2.

Thus, in some examples, where a signal S is received by the integrated circuit (S may be indicative of a particular event), the mapping portion 5 links that signal to function F, and the mapping interface 4 will map signal S to function F.

In some examples it is possible to 're-map' signals (i.e. events) to different functions. That is to say, the same event can trigger different functions. For example, a signal $S_1$ (indicative of event $E_1$) received by, say, the hardware event interface 14, can be mapped by the mapping interface 4 to a function $F_1$. The mapping interface 4 can perform this mapping by placing an event index associated with function $F_1$ on the event queue. Such an event index may comprise a function pointer $FP_1$ which points to function $F_1$. Function pointer $FP_1$, when read by the state machine, will cause the state machine 6 to look in the memory 2, and to read the instructions at the memory address pointed to by that function pointer (which instructions will in this example be function $F_1$).

The mapping interface 4 can re-map signal $S_1$ such that if it is received again, i.e. subsequent to the first time it is received, that signal will be mapped to a different function, e.g. function $F_2$. The mapping interface 4 can perform this further mapping, i.e. the re-mapping. The mapping interface 4 does this in some examples by placing an event index associated with function $F_2$ on the event queue. Such an event index may comprise a function pointer $FP_2$ which points to function $F_2$. Function pointer $FP_2$, when read by the state machine 6, will cause the state machine to look in the memory 2, and to read the instructions at the memory address pointed to by that function pointer (which instructions will in this example be function $F_2$).

In another example, the mapping interface 4 can re-map signal $S_1$ to function $F_2$ by modifying function pointer $FP_1$ to point to function $F_2$ rather than pointing to function $F_1$.

The re-mapping can be performed by the mapping interface 4 by modifying the mapping portion 5 which describes the mapping between signals and functions.

As an example, the first time an event occurs it is desirable to run some initialising or setup instructions before running some processing instructions. Signal $S_1$ (event $E_1$) is mapped by the mapping interface 4 to function $F_1$ using function pointer $FP_1$. $FP_1$ points to an address location $L_1$ at which function $F_1$ (which could be setup instructions) is located. At the end of function $F_1$ is a jump instruction to address location $L_2$ at which function $F_2$ (which could be other processing instructions) is located. A stop instruction at the end of function $F_2$ returns the state machine 6 to the idle state.

The first time event $E_1$ occurs, it is desired to run both functions $F_1$ and $F_2$. However, in this example, function $F_1$ need not be run again until a reset occurs. The integrated circuit is arranged to re-map signal $S_1$ to achieve this. There are different ways that this can be done. One example is for function $F_1$ to include instructions which can be executed by the state machine 6 to modify function pointer $FP_1$ to point to $L_2$ (i.e. function $F_2$) instead of to $L_1$ (i.e. function $F_1$). One example is for the mapping interface 4 to be arranged to place a different event index on the event queue 8 in response to event $E_1$, which different event index would cause function $F_2$ to be run.

In other examples, the mapping interface 4 is configured to modify the mapping portion 5 in response to receiving signal $S_1$ so that when signal $S_1$ is received again it will be re-mapped to a different function (compared to the first time that it is received). In some examples, the mapping interface 4, for example the mapping portion 5, comprises a signal counter 17 which can store the number of times that a given signal has been received. In some examples, the signal counter 17 need only store a flag or bit which can indicate whether the given signal has been previously received or not.

Where, for example, signal $S_1$ is received, and the signal counter 17 indicates that this signal has not been previously received, the mapping interface 4 can map $S_1$ to, say, $F_1$, and place a corresponding event index on the event queue. The mapping interface 4 can then modify the signal counter 17 to indicate that $S_1$ has been received, such as by setting a flag against a bit corresponding to signal $S_1$. The mapping interface 4 can also modify the mapping portion 5 to re-map $S_1$ to $F_2$ (such that the next time $S_1$ is received it will be mapped to $F_2$).

Where signal $S_1$ is subsequently received, the signal counter 17 will indicate that this signal has been previously received, and the mapping interface 4 can map $S_1$ to $F_2$ and place a corresponding event index on the event queue. This time, the mapping interface 4 need not modify the mapping.

Combinations of these approaches are possible. Such combinations are useful in more complex situations.

The combination used in a situation will depend at least in part on whether the instructions are held in a ROM or a RAM, which will affect the place in the process flow at which modifications are able to be made, such as by the state machine 6 and/or the mapping interface 4.

The re-mapping of event indices and/or function pointers can allow for more complex power state transition tables to be implemented, with a higher code density and therefore a smaller RAM needed.

In some cases the PMU IC can lock up when processing instructions. In some examples a PMU IC lock-up can be avoided by a process timeout. A timeout function loads a value, for example a 32-bit value, into a free-running down-counter and starts it running. In some examples the down-counter runs off a PMU clock. If the counter reaches zero then the micro-controller will be returned to the idle or 'wait' state, as if a stop instruction had been reached.

As mentioned above, it is possible to execute functions from memory external to the integrated circuit. In some examples, this is done by way of an instruction in internal memory 2 calling a function in external memory. This can be by way of a jump. The instruction in internal memory 2 can call the function in external memory by specifying the memory address at which the external function is located. The integrated circuit is in some examples arranged so that the address in internal memory 2 at which the external function was called is saved as a return point, so that when the external function has completed, operation returns to the memory address of the return point, i.e. back in internal memory 2. Alternatively, a different return point can be specified to, in effect, jump to another memory address in internal or external memory.

This use of external memory allows long functions which might not be required in standby conditions to be executed from system memory (for example dynamic voltage and frequency scaling (DVFS) look-ups). This minimises the requirements for power-consuming memory in the always-on power domain (in which the PMU IC is located).

If a function related to a given event is particularly large, it could run the risk of blocking the processing of higher priority events on the queue for a relatively long time. In this case, the function would still need to be completed. The function should complete without another event being required to trigger it. However, in some situations it is desirable to yield to other instructions before carrying on with the execution of that function. In some examples, this is dealt with by breaking down that large function into smaller, more manageable, functions. A large function could, for example, be broken into first and second smaller functions. Each smaller function can be assigned a function pointer. The function pointer for the first of the smaller functions is, in some examples, the same as the function pointer for the large function. At the end of each smaller function (except the final smaller function) an instruction can be called to reschedule the next smaller function. In other words, to place an event index referring to that next smaller function on the event queue 8.

Where other event indices are on the event queue 8, these will cause other functions to be executed by the state machine 6 before the next of the smaller functions is executed by the state machine 6. Thus, in this way, the processing of other events is not delayed by the time taken to execute all of the parts of the large function. When the event index corresponding to the next smaller function reaches the top of the event queue 8 (which might be immediately, if there are no other event indices on the event queue 8), it is processed by the state machine 6.

In some examples the function to reschedule the next smaller function queries the state of the event queue 8. The querying of the state of the event queue 8 comprises querying the fill level of the event queue 8. This can comprise querying whether the processor has been notified of an overflow condition.

An option is to prevent the rescheduling function from rescheduling the next smaller function of the large event where the event queue 8 is full, and/or where the processor has been notified of an overflow condition. Instead the rescheduling function may return the next smaller function to the state machine 6 to continue execution.

In this way, the large function can be broken down so as to avoid delaying other events, but can still be completed if rescheduling is not possible.

A given function may be considered to be a large function (and so need breaking down into smaller functions) if it comprises more than a threshold number of instructions and/or processing steps. A given function may be considered to be a large function if it takes (or is estimated to take) more than a threshold time to execute.

If a given function is considered to be a large function, then optionally it can be broken down into smaller functions for rescheduling based on at least one of the following criteria:

whether the content of the event queue 8 (the number of event indices on the event queue 8) is above a given threshold;

The threshold can comprise at least one of a percentage fill level and a number of free slots: the threshold is crossed when the percentage fill level is exceeded, and/or the number of free slots drops below a given number.

If the number of event indices on the event queue 8 is above the threshold, this can indicate that there are enough other functions waiting to be executed that it is worth considering breaking down the large function, so as not to delay the execution of these other functions.

whether the large function is time-critical;

If the large function is time-critical then it can be determined that it should not be broken down and rescheduled, but executed in one go. Where the large function is not time-critical, it can be determined that it can be broken down into smaller functions, at least one of which can then be rescheduled.

Whether or not a function is time-critical can be determined based on, for example, whether at least one of: a given number of other functions depend on its execution, completion of a task with at least a given priority level depends on its execution, and the function itself is associated with at least a given priority level.

Where it is determined that the large function is to be broken down and at least one of the smaller functions rescheduled, a reschedule instruction can be inserted into the large function. This can cause at least a portion of the large function (i.e. a smaller function) to be placed at the end of the event queue 8. This can be achieved by placing a function pointer to that smaller function on the event queue 8. The function pointer to that smaller function can be placed on the event queue 8 at the stage that the large function is broken down, or during or at the end of execution of a portion of the large function preceding the smaller function.

In some examples the function instructions are held in a RAM. The host CPU would in these examples need to populate the memory 2 with an initial image comprising a set of instructions for the state machine 6 to execute, which are grouped into functions, and also a set of function pointers which link events to those functions. In some examples the functions are hierarchical. This can enable more complex operations to be built up out of simpler functions.

In some examples, the integrated circuit is arranged to re-map physical addresses to a local virtual address space for each bus initiator/virtual machine. The integrated circuit can control what is allowed to be accessed in the physical address space. In some examples, this control is done with the granularity of the size of a memory management unit page. The page can be of a range of sizes. The page can be aligned on any desired boundary, for example 1 KB byte-address boundaries. This can be fixed at SoC design and defined to the PMU IC by means of a given parameter, for example on initialisation.

In some examples, each software event slot 22 is placed on its own access page (and therefore separated by the virtualisation scheme from all other slots 22). In some examples, the event slots 22 are grouped, for example in powers of 2, into a page where a virtual machine compartment requires this. This can mean that each virtual machine may only access power events made available to it, preventing an 'insecure' software agent causing undesired power-down events.

In some examples the function instructions are held in a ROM. In these examples there is no need to download a firmware image. The PMU IC will be ready to process power-management events immediately after running the power-on reset sequence.

In some examples there is an extension of the ROM. In some examples this extension is an extra 64 bytes. This can be made up of 16 32-bit registers. This is to allow patching of the firmware as a backup should it be required. In an example an unused function pointer in the ROM points to the top of this extension, to enable the extension to be accessed.

Once the PMU IC has completed its power-on reset sequence and has valid firmware to parse, the host CPU will be able to communicate with the PMU IC via the mapping interface 4, alongside any IPs (or IP cores) involved with power state management, to initiate power management tasks (referred to as software events). In addition, such tasks can be configured to be executed on hardware flags being set (referred to as hardware events).

Some examples of power management events that could be carried out are:
power down a power domain or a linked series of power domains at host request;
power up one, many or all power domains on certain IPs flagging a wake up request;
control PMICs or voltage regulators for DVFS/AVS;
read registers from a peripheral to decide if a full SoC wake up is required (such as reading from an IR block);
control an external IC's power;
use peripherals such as SPI/I2C to control external ICs/peripherals;
configure clock controller;
power up or down PLLs and other analogue IPs; and
read process/voltage/temperature monitors for DVFS.

The integrated circuit is, in some examples, arranged so that as power management events arrive, whether instigated by software or hardware events, they will be placed (i.e. each will cause an event index relevant to that event to be placed) on the event queue 8, and processed one at a time.

The state machine 6 may be arranged so that when it has completed its current task it will read the next event index from the event queue 8 and carry out its associated task. If there are no event indices in the event queue 8 then the state machine 6 will enter (or remain in) its idle state until an event index arrives on the event queue 8.

The RAM and/or ROM contains a number of function pointers which are linked by indexing to either a hardware event or a write to software event slot (or hardware event slot for debug). The state machine 6 can in some examples only leave its idle state by jumping to an address held in one of these function pointers. In some examples, each function pointer holds a 16-bit address of some useful function.

The integrated circuit is in some examples arranged so that on the occurrence of an event on the hardware event interface 14 (for example an event on one of the wake-up/sleep interfaces), the state machine 6 is arranged to jump to the respective function pointer.

The integrated circuit is in some examples arranged so that on the occurrence of a host write to a software event slot 22 (i.e. a software event), the state machine 6 is arranged to jump to the respective function pointer.

Figure 4:
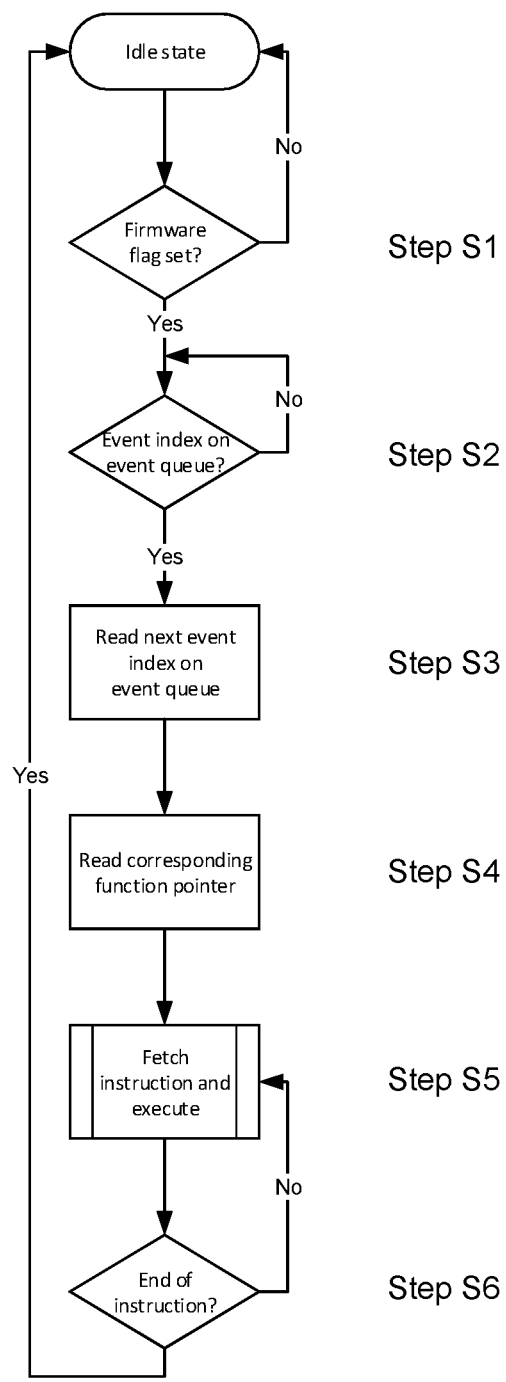
FIG. 4 shows a flowchart illustrating a process carried out by an integrated circuit.

As events occur on the hardware and/or software event interfaces, they are placed on the event queue 8. The event queue is a FIFO structure onto which is placed event indices. Referring to FIG. 4, when the state machine 6 is in an idle state (and when the firmware ready flag is set (step S1)) it checks to see if there is an event index on the event queue (step S2). If so, the state machine 6 reads the next index from the event queue (step S3) and reads the corresponding function pointer (step S4) so as to be able to start executing a function pointed to by that function pointer (at step S5). The state machine 6 continues processing until it reaches the end of the instruction (step S6) when it returns to its idle state. To this extent, there is in some examples no priority encoding for power-management events. They are executed on a first-come, first-served basis, one at a time.

In some examples, the mapping interface 4 is arranged so that if hardware and software event requests arrive at the same time, the hardware event request is pushed onto the event queue first, with the software event request following it.

In some examples software running on any trusted CPU is able to generate power management events. This is done by accessing an event slot 22 within the mapping interface 4.

In some examples the event slots 22 comprise 4 32-bit registers. Other sizes and/or configurations are possible. The registers can be generic. The use of generic registers can reduce costs. It can also help with scalability as multiple registers of the same kind can be included. This arrangement can provide a flexible software interface. It is not necessary to define beforehand (i.e. before shipping a chip containing the integrated circuit) all the attributes of the software that will run on this interface. Instead it is possible to decide in the software itself how to implement the interface.

The interface (or event slot) operation and/or behaviour is determined by the firmware image, for example a binary image, that is loaded. It is desirable for the interface to be compatible with different operating systems (OSs). The interface is configurable so that the registers of the event slots are compatible with different OSs.

However, preferably an external agent, such as an OS, will not be able to change the behaviour of the interface or registers. This behaviour should be a function of the firmware rather than of the OS. The OS need only see the interface as a communications tool. Thus there need not be visibility of all of the registers on the OS side: it need only see the registers with which it communicates. This can simplify the software at the OS side.

It is also possible for the interface to permit communication between different portions of a computing system where different security schemes are employed in each portion. For example, it can control page access over page boundaries. This increases compatibility between such portions.

The interface can be an interface between an OS and one or more power domains.

Each slot 22 is addressed as a single 32-bit location from the perspective of the host CPU. The number of slots in each memory management page is determined by a system parameter. This can aid the re-mapping of system addresses into the PMU IC address map. This can then allow different virtual machines or secure kernels to have their own dedicated set or sets of event slots.

Figure 2:
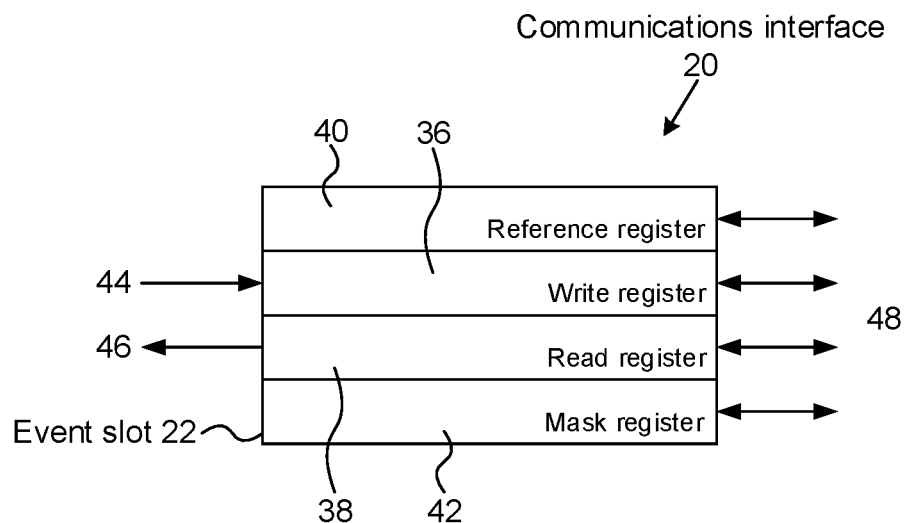
FIG. 2 shows a schematic representation of a communications interface.
Figure 2:
Figure 2:

Referring to FIG. 2, in some examples each event slot comprises a write register 36, a read register 38, a reference register 40 and a mask register 42. The event slot 22 is arranged so that the host can write to the write register 36 (illustrated at line 44) and read from the read register 38 (illustrated at line 46). In one example the host writes to and reads from the respective registers using the single 32-bit location address. In some examples the state machine 6 has read and/or write access to both of the write register 36 and the read register 38. In some examples the state machine 6 has read and/or write access to each of the registers in the event slot 22 (illustrated at lines 48). In this sense, the state machine can individually address the registers in the event slot 22.

In some examples the write register 36 comprises a single 32-bit value which is updated when the host writes to the event slot 22. In some examples the read register 38 comprises a single 32-bit value which is populated by the state machine 6 and read by the host. In some examples the host polls the read register 38 to check whether a task is complete.

In one example the mask register 42 comprises a mask value which is used to determine the setting of interrupts and the calling of interrupt management functions. Where a bit is set to '1', if the corresponding bit in the read register 38 is set, an interrupt is triggered. If the corresponding bit in the write register 36 is set and a corresponding bit in the reference register (an Aw bit—see below) is set, an index to a function pointer (here the write function pointer index) is pushed onto the event queue 8.

In one example the reference register 40 comprises the following fields:
  an activate on write field (Aw)—setting this bit indicates that the write function pointer index (for example as stored in the write function pointer index field) will be pushed onto the event queue 8 when the host sets any bit in the write register 36 whose corresponding bit in the mask register 42 is not set;
  an activate on read field (Ar)—setting this bit indicates that the read function pointer index (for example as stored in the read function pointer index field) will be pushed onto the event queue 8 when the read register 38 is read by the host;
  an activate on interrupt acknowledge field (Ai)—setting this bit indicates that the interrupt pointer index (as stored in the interrupt pointer index field) will be pushed onto the event queue 8 when the host sets any bit in the write register 36 whose corresponding bit in the mask register 42 is set;
  a write function pointer index field—this field comprises a write function pointer index value which can be pushed onto the event queue 8 when Aw is set (for example to '1') and the event slot 22 is written to (i.e. the host writes to the write register 36). In one example the write function pointer index comprises an address location (for example in a RAM or a ROM) at which this function is located. In one example the write function pointer index comprises an offset from the top of the function pointers field in the memory 2 (for example in a RAM or a ROM);
  a read function pointer index field—this field comprises a read function pointer index value which can be pushed onto the event queue 8 when Ar is set (for example to '1') and the event slot 22 is written to (i.e. the state machine 6 writes to the read register 46). In one example the read function pointer index comprises an address location (for example in a RAM or a ROM) at which this function is located. In one example the read function pointer index comprises an offset from the top of the function pointers field in the memory 2 (for example in a RAM or a ROM);
  an interrupt pointer index field—this field comprises an interrupt function pointer index value which can be pushed onto the event queue 8 when Ai is set (for example to '1') and the event slot 22 is written to (i.e. the host writes to the write register 36). In one example the read function pointer index comprises an address location (for example in a RAM or a ROM) at which this function is located. In one example the read function pointer index comprises an offset from the top of the function pointers field in the memory 2 (for example in a RAM or a ROM);
  an IRQ self-clear field—setting a bit in this field will enable the writing of any bit in the write register 36, where the relevant mask register 42 bit is also set, to clear the corresponding bit in the read register 38. This can be used for immediate IRQ clears without necessarily calling an interrupt acknowledge function;
  a copy-back enable field—setting this bit indicates that all writes to the write register 36 by the host will be immediately reflected on the read register 38. This emulates the behaviour of a single read/write configuration register;
  an IRQ number field—this field specifies the physical IRQ line to be set when the IRQ conditions for the slot 22 are met; and
  an IRQ enable field—setting this bit enables the generation of interrupts (which avoids the need for the host to poll the event slot 22 to determine whether the related task has completed, as described below).

In at least some examples the Aw, Ar, Ai, IRQ self-clear, copy-back enable and IRQ enable fields are single-bit length fields and the remaining fields are multiple-bit length fields. In some examples a subset of these fields can be used. For example, the IRQ self-clear field need not be provided as part of the reference register 40.

This configuration allows for a simple event trigger. In some examples it allows up to 32 bits of parameters to be exchanged between the host and the PMU IC. In one example, the host writes a parameter to the write register 36 of a slot 22 in which Aw is set and polls the event slot 22 until the state machine 6 writes a valid response to the read register 38.

In some examples multiple adjacent slots 22 can be used. This allows for more data to be exchanged. In one configuration, only one slot 22 is allocated as the event trigger by having one or more of its activate bits (i.e. Aw, Ar and Ai) set. The other slot or slots in the multiple slots are used to write to the state machine 6 and read from the state machine 6. In other words, where an event slot 22 comprises 4 registers, all 4 registers are used for the first slot of a group of multiple slots (which are used to exchange data related to a single event), whereas only the write registers 36 and read registers 38 are used for the remaining slots in the group. These registers can act as 'overflow' registers where more than 32 bits (for example) of data is transferred in one go.

In some examples, the host need not poll the read register 38 to determine when the state machine 6 has completed its task. Such polling would consume CPU resources for as long as the task takes to reach the end of the event queue 8 and to be completed by the state machine 6. An event can be configured to use a physical interrupt line. In one example there are 16 physical interrupt lines which can be used.

The architectural choice of how many of these physical interrupt lines are implemented can be based on the principle of treating each management event as a separate IP so that each IRQ can effectively be assigned to an event slot 22. This can avoid the need to poll multiple event slots to discover the source of the interrupt.

For such an interrupt to be enabled, in one example the event slot 22 registers are initialised with a bit set in the 'IRQ enable' field, and a non-zero value in the mask register 42.

In some examples, interrupt management may be configured along the following lines. The host CPU can write to an event slot 22 and set one or more bits where the corresponding bits in the mask register 42 are zero. This can represent a data handshake which, if Aw is set, pushes the stored write function pointer index onto the event queue 8. When this index reaches the top of the event queue 8, the state machine 6 executes the relevant function (i.e. the function that is pointed to by the function pointer) and concludes by writing to the read register 38. The state machine 6 sets any return values, and any interrupt status bits corresponding to bits set in the mask register 42. If the resulting bitwise AND comparison between the read register 38 and the mask register 42 is non-zero, the IRQ line corresponding to the value in the 'IRQ number' field is set.

The host CPU takes the interrupt line specified by the value in the 'IRQ number' field and reads the read register 38 to determine the reasons for the interrupt. The host CPU can clear the interrupt source by writing to any of the bits that are correspondingly set in the mask register 42.

At this point, one of two mechanisms may operate. If the Ai bit is set (i.e. if it is '1') then the interrupt function pointer index is placed on the event queue 8. This can allow the PMU IC to execute a specific response which in some examples includes clearing some, all or none of the interrupt bits in the read register 38. If the IRQ self-clear bit is set (i.e. if it is '1') then any interrupt bits that are written to will clear the corresponding bits in the read register 38. Once all bits are cleared, the interrupt line will be deasserted.

In one configuration, the function is expected to clear the write register 36, i.e. it is effectively a 'set' register. Therefore just the interrupt clear bits of the slot can be written to (without needing a read-modify-write operation) and not be expected to push the write function pointer index onto the event queue 8 again.

Whilst a single event slot 22 corresponds, in some examples, to a given event, this need not be the case. In other words, in some examples there is not a one-to-one mapping between slots 22 and events. Multiple slots within a page or across multiple pages may be associated with a single function pointer and/or power event.

In some examples hardware-generated power event requests are hardware flags from certain IPs which infer that some change of power state is required. These can include wake-up events and sleep events. Wake-up events can typically be interrupts from peripheral IPs in the always-on domain, such as an infra-red remote receiver, watchdog timer, Ethernet MAC (magic-packet wake-up) and panel button, amongst others. Sleep events can for example include the setting by an RPU of a sleep flag which is set when it requires all clocks to be turned off (other than the sleep clock).

The hardware event interface 14 is in some examples configured to detect an edge (it can be programmable as to which type: rising, falling, or both) in an input signal. In some examples the hardware event function pointers can be re-mapped. A request to this effect may generate an edge that is detectable by the hardware event interface 14. On determining such a request, the hardware event interface 14 may be configured to push an index matching the request onto the event queue 8, which can re-map one or more function pointers when the event is processed by the state machine 6. For example this might be by modifying the function pointer and/or by modifying which function pointer a given signal maps to. At least one of these modifications can be by the mapping portion 5 being modified.

Thus, in some examples, the mapping of a signal to a function can be modified in response to another signal being received.

In some examples the PMU IC is a single clock-domain IP, operating normally from its own dedicated clock source. In some examples the clock source is shared with the always-on domain's bus clock to reduce the need for local bus resynchronisation. Under normal conditions, this would be expected to be targeted to the frequency of the free-running oscillator on the PCB, for example a crystal oscillator, to negate the need for PLLs during stand-by and/or low power operation. In some examples, for even lower power operation, the PMU's clock source can include programmable clock dividers to allow a crystal clock source to be further reduced in frequency. If higher-performance operation is also required, for example for running DVFS/AVS algorithms during normal running, the clock source can optionally come from a fast-clock source such as a PLL.

In some examples the inputs (general purpose inputs and requests amongst others) will be synchronised to the PMU clock for metastability. The bus interfaces may not have internal synchronisation so this should be provided in the bus fabric. In some examples outputs from the PMU will be resynchronised to local clock domains at their end-points.

In some examples the integrated circuit described above is used as a low-cost, generic co-processor for relieving one or more CPU of specific background tasks, rather than as a dedicated power controller (for example running fast, table-based DVFS routines or other lookup/hash routines).

The integrated circuit/PMU and event slots 22 of FIGS. 1 to 3 are shown as comprising a number of functional blocks. This is schematic only and is not intended to define a strict division between different logic elements of such entities. Each functional block may be provided in any suitable manner. It is to be understood that intermediate values described herein as being formed by the integrated circuit need not be physically generated by the integrated circuit at any point and may merely represent logical values which conveniently describe the processing performed by the integrated circuit between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an integrated circuit or a communications interface configured to perform any of the methods described herein, or to manufacture an integrated circuit or a communications interface comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an integrated circuit or a communications interface will now be described with respect to FIG. 5.

Figure 5:
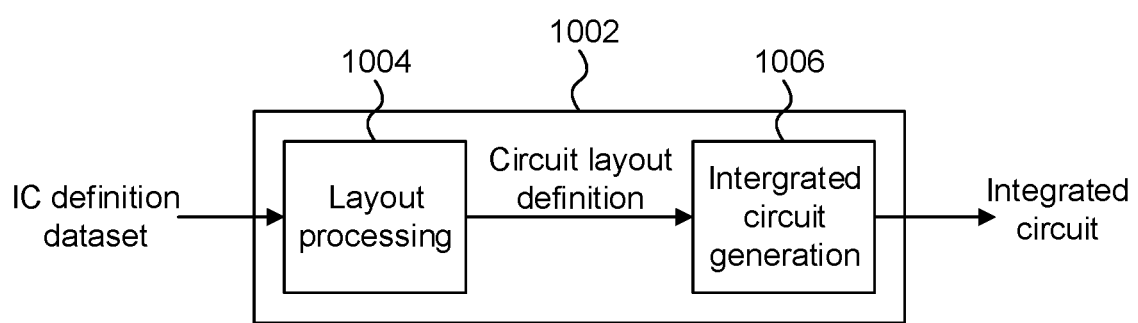
FIG. 5 shows an example of an integrated circuit manufacturing system.

FIG. 5 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining an integrated circuit or a communications interface as described in any of the examples herein), process the IC definition dataset, and generate an IC according to the IC definition dataset (e.g. the IC described, or which embodies a communications interface as described, in any of the examples herein). The processing of the IC definition dataset configures the IC manufacturing system 1002 to manufacture the integrated circuit described, or an integrated circuit embodying a communications interface as described, in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture the described integrated circuit or communications interface without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. The IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. An integrated circuit comprising:
a memory configured to store a plurality of executable instructions to perform a plurality of functions;
a mapping interface configured to perform a mapping from a received first signal to a first function of the plurality of functions;
a state machine configured to, in response to said mapping, execute the first function; and
an event queue configured to receive a plurality of event indices;
wherein the integrated circuit is arranged to, in dependence on the execution of the first function at the state machine, modify said mapping between the first signal and the first function so as to re-map the first signal to a second function of the plurality of functions such that, on receiving a subsequent first signal, the state machine is configured to execute the second function,
the state machine being configured to read event indices on the event queue, wherein the reading by the state machine of an event index from the event queue causes the state machine to execute at least one of the plurality of functions.

2. An integrated circuit as claimed in claim 1, wherein the integrated circuit is arranged to re-map the first signal to the second function at least one of: in dependence on the number of times the first function is executed at the state machine; and as part of the execution of the first function at the state machine.

3. An integrated circuit as claimed in claim 1, wherein the mapping comprises a first pointer associated with the first signal, which first pointer points to the first function.

4. An integrated circuit as claimed in claim 3, wherein the integrated circuit is arranged to re-map the first signal to the second function by one of: associating a second pointer with the first signal in place of the first pointer, which second pointer points to the second function; and modifying the first pointer to point to the second function.

5. An integrated circuit as claimed in claim 1, wherein said mapping comprises writing a first event index to the event queue, which first event index when read by the state machine causes the state machine to execute the first function.

6. An integrated circuit as claimed in claim 5, wherein the first event index comprises the first pointer.

7. An integrated circuit as claimed in claim 1, wherein the re-mapping of the first signal to a second function comprises writing a second event index to the event queue, which second event index when read by the state machine causes the state machine to execute the second function.

8. An integrated circuit as claimed in claim 7, wherein the second event index comprises one of the modified first pointer and the second pointer.

9. An integrated circuit as claimed in claim 1, wherein the state machine is configured to have an idle state in which it waits for an event index to be written to the event queue, and an active state in which it executes at least one of the plurality of functions in response to reading an event index from the event queue.

10. An integrated circuit as claimed in claim 1, wherein where the first function is a large function, the integrated circuit is arranged to break the first function into smaller functions comprising a first smaller function and a second smaller function, and to associate a third pointer with the first smaller function and a fourth pointer with the second smaller function such that the third and fourth pointers point to the respective smaller functions;
the integrated circuit being arranged, on receiving the first signal, to write an event index comprising the third pointer to the event queue such that the state machine executes the first smaller function; and subsequently to write an event index comprising the fourth pointer to the event queue such that the state machine executes the second smaller function after the execution of the first smaller function.

11. An integrated circuit as claimed in claim 10, wherein the integrated circuit is arranged to write the event index comprising the fourth pointer to the event queue during or at the end of execution of the first smaller function.

12. An integrated circuit as claimed in claim 1, wherein where the first function is a large function, it can be broken down into smaller functions for rescheduling in dependence on at least one of:
whether the number of event indices on the event queue is above a given threshold, and
whether the large function is time-critical.

13. An integrated circuit as claimed in claim 1, wherein the event queue is arranged to hold a maximum of N event indices, and the integrated circuit is arranged to determine the number of event indices held on the event queue.

14. An integrated circuit as claimed in claim 1, wherein the integrated circuit is arranged so that on completion of an initialisation sequence, a flag is set to cause and/or enable the state machine to start processing event indices held on the event queue.

15. An integrated circuit as claimed in claim 1, wherein the mapping interface comprises at least one of a hardware interface and a software interface.

16. An integrated circuit as claimed in claim 1, wherein the mapping interface comprises a communications interface for interfacing between a host system and the state machine, the communications interface comprising:
an event slot, the event slot comprising a plurality of registers including:
a write register for writing by the host system, and
a read register for reading by the host system,
wherein the event slot is addressed from the host system by a single address location permitting the host system to write data to the write register and/or read data from the read register; and wherein the write register and the read register are individually addressable by the state machine.

17. An integrated circuit as claimed in claim 16, wherein the communications interface comprises a plurality of event slots, and at least two of the plurality of event slots are addressed from the host system using different address locations.

18. A power management unit, comprising the integrated circuit as claimed in claim 1.

19. A method of executing at least one function in response to a signal received by an integrated circuit, the integrated circuit comprising a memory, a mapping interface, an event queue configured to receive a plurality of event indices and a state machine, the method comprising:
storing in the memory a plurality of executable instructions to perform a plurality of functions;
receiving a first signal at the integrated circuit;
performing a mapping at the mapping interface from the received first signal to a first function of the plurality of functions;
executing at the state machine the first function in response to said mapping;
in dependence on the execution of the first function at the state machine, modifying at the integrated circuit said mapping between the first signal and the first function so as to re-map the first signal to a second function of the plurality of functions such that, on receiving a subsequent first signal, the state machine is configured to execute the second function,
wherein the method comprises reading event indices on the event queue by the state machine, the reading of an event index from the event queue causing the state machine to execute at least one of the plurality of functions.

20. A non-transitory computer readable storage medium having stored thereon a computer readable description of an integrated circuit that, when processed in an integrated circuit manufacturing system, causes the integrated circuit manufacturing system to manufacture an integrated circuit comprising:
a memory configured to store a plurality of executable instructions to perform a plurality of functions;
a mapping interface configured to perform a mapping from a received first signal to a first function of the plurality of functions;
a state machine configured to, in response to said mapping, execute the first function; and
an event queue configured to receive a plurality of event indices;
wherein the integrated circuit is arranged to, in dependence on the execution of the first function at the state machine, modify said mapping between the first signal and the first function so as to re-map the first signal to a second function of the plurality of functions such that, on receiving a subsequent first signal, the state machine is configured to execute the second function,
the state machine being configured to read event indices on the event queue, wherein the reading by the state machine of an event index from the event queue causes the state machine to execute at least one of the plurality of functions.

* * * * *